United States Patent [19]

Kato et al.

[11] Patent Number: 4,876,893
[45] Date of Patent: Oct. 31, 1989

[54] STRAIN GAUGES FOR THE PRESSURE SENSOR

[75] Inventors: Yukihiro Kato; Masami Ishii; Ryohei Yabuno, all of Toyota; Tetsuo Oka, of Toyoake, all of Japan

[73] Assignee: Aisin Seiki Kabushiki Kaisha, Aichi, Japan

[21] Appl. No.: 137,822

[22] Filed: Dec. 24, 1987

[30] Foreign Application Priority Data

Dec. 26, 1986 [JP] Japan .................. 61-314349

[51] Int. Cl.$^4$ .......................... G01L 7/08; G01L 9/04
[52] U.S. Cl. ................................. 73/726; 73/708; 73/720; 338/4; 338/42
[58] Field of Search .............. 73/720, 721, DIG. 4, 73/726, 727, 708, 862.36, 862.65, 862.66, 862.67

[56] References Cited

U.S. PATENT DOCUMENTS

| | | | |
|---|---|---|---|
| 3,899,766 | 8/1975 | Mermelstein | 338/ |
| 4,500,864 | 2/1985 | Nakane et al. | 73/72u |
| 4,511,877 | 4/1985 | Nishikawa | 73/862.65 |

Primary Examiner—Donald O. Woodiel
Attorney, Agent, or Firm—Oblon, Spivak, McClelland, Maier & Neustadt

[57] ABSTRACT

In order to improve the stabilization and the heat-resistance of a strain gauge, the strain gauge is made of an amorphous alloy including Ni (nickel), Cr (Chromium) and Si (silicon). The amorphous alloy including Ni, Cr and Si has a high crystallization point, its temperature co-efficient of resistance is almost zero obtained by annealing. The amorphous alloy is stabilized from low to high temperatures and thus can be used from low to high temperatures without compensation. The amorphous alloy is a non-magnetic substance and the strain gauge thus is not substantially affected by external electromagnetic noise.

7 Claims, 1 Drawing Sheet

STRAIN GAUGES FOR THE PRESSURE SENSOR

BACKGROUND OF THE INVENTION

The present invention relates to a strain gauge for the pressure sensor and method for manufacturing the same, and especially relates to an improved strain gauge and method for manufacturing which obtains high stabilization.

Japanese laid-open patent publication No. 174844/1985 published on Sept. 9, 1985 discloses a conventional strain gauge prepared on a diaphragm. Referring now to FIG. 3, the conventional strain gauge is explained. As shown in FIG. 3, two pair of the strain gauges A and B are provided on a central part and circumference part of a diaphragm 2. In order to convert the applied pressure to the electric signal linearly, the respective pair of strain gauges A and B are connected together as a bridge circuit.

The strain gauges A and B are made of an amorphous alloy film of amorphous $Ni_aSi_bB_c$, where symbols a, b and c have ranges as $60 \leq a$ (atomic%) $\leq 74$, $16.5 \leq b$ (atomic%), $26 \leq b+c$ (atomic%) $\leq 40$. The strain gauges A and B are provided onto the diaphragm directly by using sputtering method or vacuum deposition method.

A conventional alloy of amorphous $Ni_aSi_bB_c$ has a very small absolute value of temperature co-efficient of resistance smaller than 50 ppm/°C. Therefore, the conventional strain gauge using the conventional alloy is stabilised against variation in temperature. Also, the conventional strain gauge is placed onto the diaphragm directly. Therefore, an adhesive need not to be used in order to attach the strain gauge on the diaphragm so that the mechanical reliability of the strain gauge is excellent. Further, the conventional alloy is a non-magnetic substance. Therefore, the strain gauge is hardly affected by the external magnetic field. Furthermore, the conventional alloy has a high resistivity and has a small cross-sectional area. Therefore, resistance of the gauge to be established is high.

However, in the conventional alloy of amorphous NiSiB, the usable range as the strain gauge is narrow, and more particularly, endurance at higher than 80° C. is not obtained.

Referring now to FIGS. 4 and 5, wherein problems of the conventional strain gauge are explained. From now on, a transit ratio is defined as the ratio between one output voltage of the bridge circuit under applying a maximum usable pressure and the other output voltage of the bridge circuit under applying no pressure to the diaphragm. The relationship between a transit ratio on a vertical axis and elapsed time on a horizontal axis is shown in FIGS. 4 and 5. FIG. 4 shows the relationship detecting under 60° C., and FIG. 5 shows the relationship detecting under 120° C.

As shown in FIG. 4, the transit ratio shows a transition within about 0.2% after 15 days under 60° C. Contrary, as shown in FIG. 5, the transit ratio shows a transition about 7% after 15 days under 120° C. Further, under 120° C., the strain gauges are separated from the diaphragm of almost all samples after 14 days, and then the transit ratio changes greatly. This phenomena shows a of the heat-resistance of the conventional strain gauge using the alloy of amorphous NiSiB.

SUMMARY OF THE INVENTION

Accordingly, one of the object of the present invention is to improve the stabilization against the temperature variation of the strain gauge for a pressure sensor which obviates the above conventional drawbacks.

And the other object of the present invention is to improve the heat-resistance of the strain gauge of the pressure sensor.

Further, another object of this invention is to provide an improved method for manufacturing the strain gauge.

In order to improve stabilization against temperature variation, the strain gauge of the present invention comprises a base plate of electrically insulated substance and a thin alloy film of non-magnetic substance on the base plate, wherein the thin alloy film is an amorphous substance including at least Ni (nickel), Cr (chromium) and Si (silicon).

Further, in order to provide the improved method for manufacturing the strain gauge, the method of the present invention include a process for preparing the non-magnetic thin film of amorphous including at least Ni, Cr and Si onto the base plate, a process for annealing the prepared thin film, and, process for treating the annealed thin film in order to prepare a pattern of the strain gauge.

The above and other objects features and advantages of the present invention will be apparent from the following description of the preferred embodiment and accompanying drawings.

DESCRIPTION OF THE PREFERRED EMBODIMENT

Figure 1:
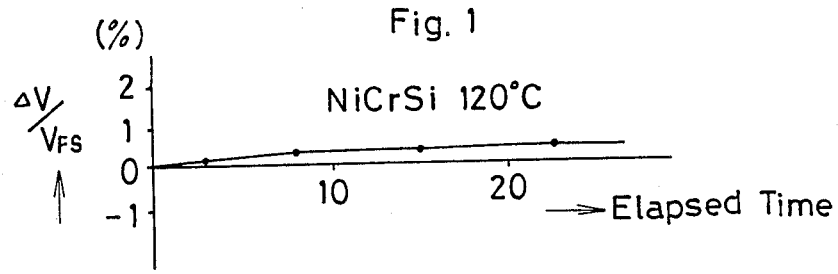
FIG. 1 is a graph showing the relationship between the transit ratio of the bridge circuit and elapsed time, which is measured by using several strain gauges of the present invention.

This embodiment discloses the strain gauges 3 of the non-magnetic substance with high electric resistance on an electrical insulated diaphragm 2. The non-magnetic substance of the present embodiment is amorphous $(Ni_aCr_{100-a})_{100-b}Si_b$, wherein symbols a and b show the weight percentage of the element, and the ranges of the symbols a and b are established as $40 \leq a(wt\%) \leq 60$, $3 \leq b(wt\%) \leq 8$.

Further, the strain gauges 3 of the present embodiment is manufactured by the following process.

Firstly, the thin film of alloy $(Ni_aCr_{100-a})_{100-b}Si_b$ is prepared onto the base plate of glass by sputtering. At this stage, only a Halo Pattern is observed in a crystal structure of the prepared alloy film by X-ray analysis. Therefore, the thin film of the alloy is identified as amorphous. Then, the resistivity of the prepared alloy film becomes about 140 to 160 micro-ohm-centimeters, and, the temperature co-efficient of resistance of the film becomes −35 to 55 ppm/°C.

Secondly, the base plate of glass after preparing the alloy film is annealed for 1 to 8 hours under 350° to 450° C. By carrying out the annealing process, an oxidized layer is prepared on surfaces of the alloy film, and structural relaxation takes place crystallization. Therefore, the electrical character is stabilized by annealing. Further, the structure of the alloy is also stabilized by annealing.

Furthermore, the annealing process is also effected in order to make the temperature co-efficient of resistance approach zero. By annealing the alloy film, the temperature co-efficient of the resistance is changed. In the alloy film of the present embodiment, the temperature co-efficient of resistance is established within $+/-30$ ppm/°C. Therefore, the alloy film of this embodiment is suitable for the materials of the strain gauge for the pressure sensor because of the stabilization against the temperature variation.

It is preferable for the thin film of alloy $(Ni_aCr_{10.0-a})_{100-b}Si_b$ to be within the ranges of symbols a and b as $40 \leq a(wt\%) \leq 60$, $3 \leq b(wt\%) \leq 8$.

Because, the alloy film prepared under the above ranges is excellent with regard to the heat-resistance and electromagnetic noise prevention.

When the range of the symbol a is established more than 60 (wt%) or the range of the symbol b is established less than 3 (wt%), the alloy film prepared on the diaphragm 2 by sputtering does not become amorphous, but becomes a crystalline substance having a face-centered cubic lattice. The resistivity of the crystalline alloy film becomes less than 130 micro ohm centimeter. And also, the temperature co-efficient of resistance of the crystalline alloy film becomes more than 20 ppm/°C. Further, after annealing, the temperature co-efficient of resistance of crystalline alloy film becomes 30 ppm/°C. Therefore, when the range of the symbol a is established more than 60 (wt%) or the range of the symbol b is established less than 3 (wt%), the heat-resistance and the electromagnet noise-prevention of the strain gauge deteriorate.

Contrary, when the range of the symbol a is established less than 40 (wt%) or the range of the symbol b is established more than 8 (wt%), the alloy film prepared on the diaphragm by sputtering becomes amorphous. However, the resistivity of the alloy film becomes more than 160 micro-ohm-centimeter, and the temperature co-efficient of resistance of the alloy film becomes less than $-55$ ppm/°C. Further, the temperature co-efficient of resistance becomes only less than $-30$ ppm/°C. after annealing. Therefore, when the range of the symbol a is established less than 40 (wt%) or the range of the symbol b is established more than 8 (wt%), the heat-resistance and the electromagnet noise-prevention of the strain gauge deteriorates.

FIG. 1 is a graph showing the relationship between the transit ratio of the bridge circuit and elapsed time, which is measured, by using the strain gauges of alloy film $Ni_{48}Cr_{47}Si_5$ under 120° C. The transit ratio of the bridge circuit is shown on the vertical axis, and the elapsed time is shown on the horizontal axis. As shown in FIG. 1, the transit ratio of the strain gauge 3 according to the present embodiment shows the transition within about 0.5% after 20 days under 120° C. Further, according to the present embodiment, the separating phenomena of the strain gauge 3 from the diaphragm 2 does not take place. Thus, the strain gauge 3 of the present embodiment is superior to the conventional strain gauge with regard to heat-resistance and adherence to the diaphragm.

Referring now to Table 1, characters of the present strain gauge 3 using the amorphous alloy film of amorphous $Ni_{48}Cr_{47}Si_5$ are compared with characters of the conventional strain gauge using the alloy film $Ni_{69}Si_{19}B_{12}$. As shown in Table 1, the resistivity of the alloy film according to the present embodiment is about 145 micro-ohm-centimeter, and which is equal to the characters of the conventional alloy substantially. Further, the temperature co-efficient of resistance of the alloy according to the present embodiment is about 0 ppm/°C., and which is also equal to the conventional alloy substantially. Furthermore, the crystallization point of the alloy according to the present embodiment is about 500° C., and which is much higher than the conventional crystallization point of about 400° C. Therefore, the alloy film according to the present embodiment has very stable structure against the temperature variation, and thus high heat-proof is obtained.

TABLE 1

| | resistivity | temperature co-efficient of resistance | crystallization point |
|---|---|---|---|
| $Ni_{69}Si_{19}B_{12}$ | 145 μΩ cm | 0 | 300° C. |
| $Ni_{48}Cr_{47}Si_5$ | 145 μΩ cm | 0 | 500° C. |

Figure 2:
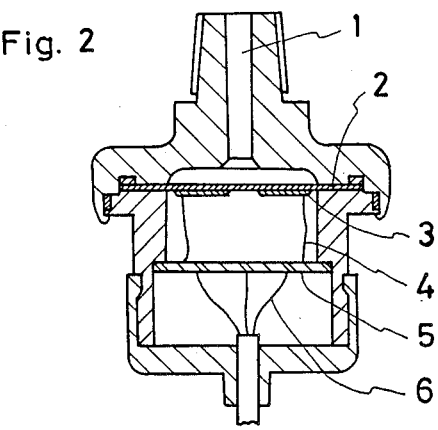
FIG. 2 is a cross-sectional view of the pressure sensor using several strain gauges of the present invention.

Referring now to FIG. 2, the pressure sensor using the strain gauges according to the present invention is explained.

The pressure sensor 10 has a first housing 7, a second housing 8 and a third housing 9. The first housing 7 has a port 1 which opens a center of the first housing 7. Further, the second housing 8 is a cylindrical member, and a electrical circuit base 5 where the amplifying circuit is prepared is contained in the second housing 8. Furthermore, a conductive wires 6 which are connected to the electrical circuit base 5 are extended through the third housing 9. The first housing 7 is fixed to one end of the second housing 8 and the third housing 9 is fixed to the other end of the second housing 8.

The diaphragm 2 is pinched between the first housing 7 and the second housing 8. The diaphragm 2 is made of glass. The four strain gauges 3 of alloy NiCrSi is provided on the central part and circumference part of the diaphragm 2 respectively. The strain gauges 3 are connected together as the bridge circuit. The bridge circuit is connected to the electrical circuit base 5 by conductive wires 4.

When a positive pressure is applied to the port 1, the diaphragm 2 is displaced. The displacement of the diaphragm 2 is substantially in proportion to the pressure applied to the port 1. The resistance of the strain gauges 3 are changed by the displacement of the diaphragm 2. When the pressure is applied to the diaphragm 2, the expansive stress is applied to the strain gauges provided on the central part of the diaphragm 2. Therefore, the strain gauges 3 provided on the central part increase their resistance. Contrary, the compressive stress is applied to the strain gauges 3 provided on the circumference part of the diaphragm 2. Therefore, the strain gauges 3 provided on the circumference part decrease their resistance. At this time, the bridge circuit generates the output voltage in proportion to the displacement of the diaphragm 2. The output voltage from the bridge circuit has good linearity against the applied pressure to the port 1. The output voltage from the bridge circuit is amplified by the electrical circuit base 5, then the amplified signal from the circuit base 5 is put out to externals through conductive wires 6.

Now, the method for manufacturing the strain gauge 3 is explained.

The diaphragm 2 is prepared by cutting the glass base plate into disk shape. The thickness of the glass base plate preferably is less than 1.5 (mm).

Secondly, the alloy film is prepared onto the glass base plate by sputtering the target of the alloy $Ni_{48}Cr_{47}Si_5$. The thickness of the alloy film preferably is established less than 0.4 micro-meter. The alloy target is sputtered by applying 1.0 (kw) of electric power from a Radio-Frequency power supply for 12 minutes under continuously flowing argon gas to $3\times10^{-5}$ (torr) continuously after reducing the pressure of $2\times10^{-5}$ (torr).

At this stage, only the Halo pattern is observed by the X-ray analysis in the prepared alloy film. Therefore, the prepared alloy film becomes amorphous.

Figure 3:
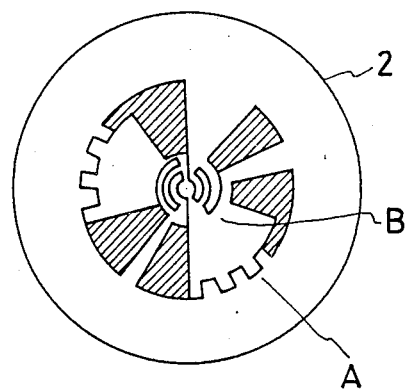
FIG. 3 is a plane view of the conventional diaphragm.
Figure 4:
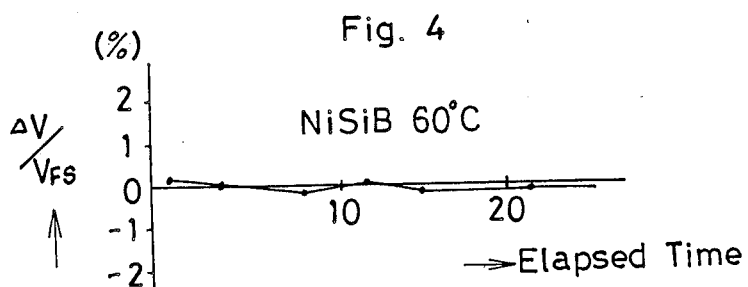
FIG. 4 is a graph showing the relationship between the transit ratio of the bridge circuit and elapsed time, which is measured by using several conventional strain gauges under 60° C.
Figure 5:
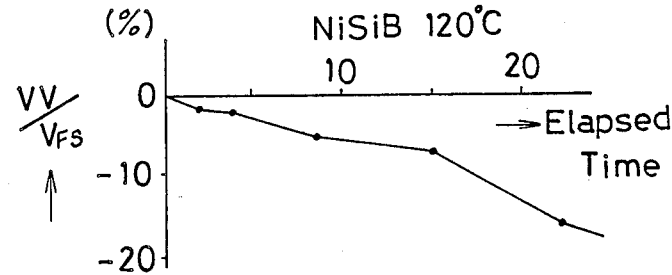
FIG. 5 is a graph showing the relationship between the transit ratio of the bridge circuit and elapsed time, which is measured by using several conventional strain gauges under 120° C.

Thirdly, the resist which has the same shape as the strain gauge 3 is prepared by treating a photo-resist, then a pattern of the strain gauge 3 is formed by treating a dry-etching. The four patterns for the strain gauges 3 are provided on the central part and the circumference part of the diaphragm 2 as in the conventional diaphragm shown in FIG. 3. Further, in order to convert the applied pressure linearly, the strain gauges 3 is connected as bridge circuit on the diaphragm 2. According to the present embodiment, resistance of the single strain gauge 3 is about 800 ohm, and the resistivity of the gauge 3 is about 145 micro-ohm-centimeter. Furthermore, the temperature co-efficient of resistance of the strain gauge 3 becomes almost 0 ppm°C. after two hours annealing under 400° C.

The strain gauge 3 according to the present embodiment is able to be used from lower temperatures to high temperatures without compensation because the strain gauge 3 has a very stable crystalline structure and high heat-resistance. Further, the strain gauge 3 according to the present embodiment can be used continuously under high temperature such as 120° C. Therefore, the pressure sensor is able to obtain the high reliability and high accuracy by using the strain gauges 3 according to the present embodiment.

A glass base plate is used as a diaphragm 2 in the present embodiment. However, the metal base plate also can be used. An insulated film of $Al_2O_3$ was prepared on the metal base plate with 1.5 (mm) thickness, and then the alloy film of amorphous $Ni_{48}Cr_{47}Si_5$ with less than 0.5 micro-meter was prepared by sputtering. At this stage, the strain gauge 3 on the metal base plate has the same character as the strain gauge 3 on the glass base plate.

Further, the alloy film is prepared by the sputtering method in the present embodiment. However, the alloy film of the present embodiment is also able to be prepared by using the vacuum deposit method.

As mentioned above, the strain gauge 3 of the present embodiment has following advantages.

(1) The strain gauge 3 of the present invention is able to be obtained with the stable characteristics even under variation of the raw composition and the variation of the manufacturing condition.

(2) The alloy NiCrSi is corrosion resistant. Therefore, face corrosion is minimized. Accordingly, a primer process for sputtering, such as a polishing, is not needed. Thus, the manufacturing cost is reduced.

(3) The alloy NiCrSi is a non-magnetic substance. Therefore, by using a manetron sputtering device, the alloy film can be prepared from a single thick target. Therefore, many strain gauges 3 can be provided from a single target, and then the manufacturing cost is thereby reduced.

What is claimed is:

1. A strain gauge comprising:
a base plate of electrically insulated substance; and
a thin alloy film of non-magnetic substance on said base plate wherein said thin alloy film is an amorphous $(Ni_aCr_{100-a})_{100-b}Si_b$ where the ranges of symbols a and b is established as $4\leq a(wt\%)\leq 60$, $3\leq b(wt\%)\leq 8$.

2. A strain gauge according to claim 1 wherein a thickness of said film is established less than 0.5 micrometer.

3. A strain gauge according to claim 1 wherein said base plate comprises a glass base.

4. A strain gauge according to claim 1 wherein said base plate comprises an insulated metal base.

5. A pressure sensor comprising:
an electrically insulated diaphragm;
a plurality of strain gauges, said strain gauges comprising a base plate of an electrically insulated substance; and a thin alloy film of a non-magnetic substance on said base plate, wherein said thin alloy film is an amorphous $(Ni_aCr_{100-a})_{100-b}Si_b$ where the ranges of symbols a and b is established as $40\leq a(wt\%)\leq 60$, $3\leq b(wt\%)\leq 8$, on said diaphragm.

6. A pressure sensor according to claim 5 wherein bridge circuit is provided on said diaphragm.

7. A pressure sensor according to claim 6 further comprising a amplifying circuit for amplifying an output from said bridge circuit.

* * * * *